H. C. WILCOX, OF WEST MERIDEN, CONNECTICUT, ASSIGNOR TO THE MERIDEN BRITANNIA COMPANY, OF THE SAME PLACE.

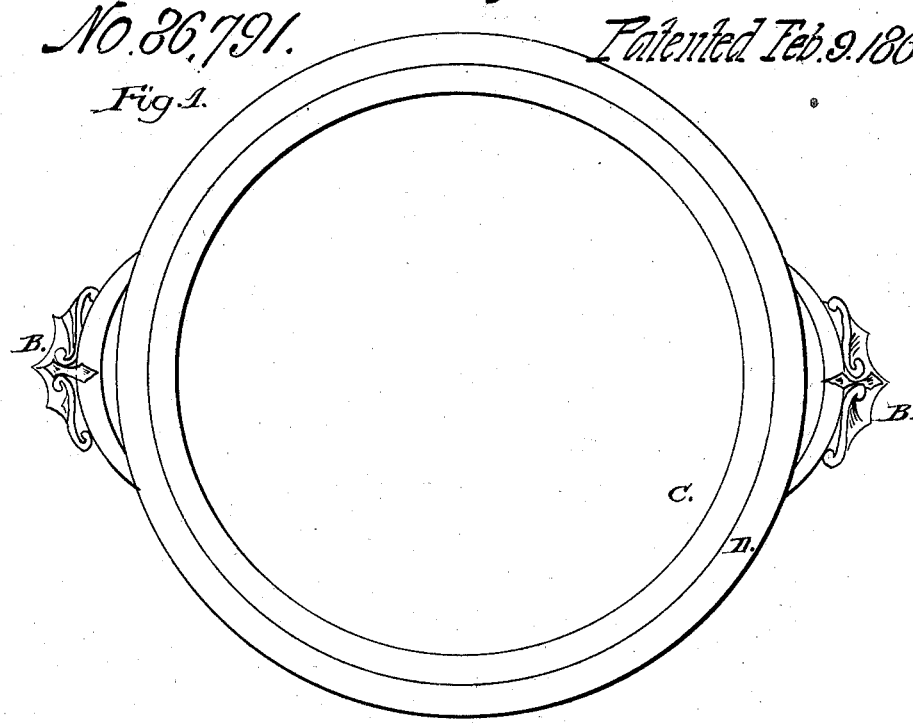
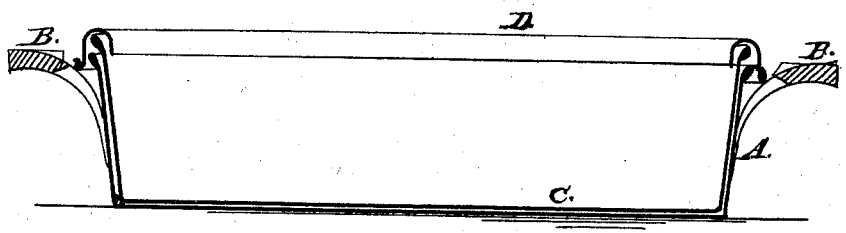

Letters Patent No. 86,791, dated February 9, 1869.

IMPROVED BAKING-DISH.

The Schedule referred to in these Letters Patent and making part of the same.

*To all whom it may concern:*

Be it known that I, H. C. WILCOX, of West Meriden, in the county of New Haven, and State of Connecticut, have invented a new and improved Baking-Dish; and I do hereby declare that the following is a full, clear, and exact description thereof, which will enable others skilled in the art to make and use the same, reference being had to the accompanying drawings, forming part of this specification.

This invention relates to a new article for cooking puddings, pies, or other similar dishes; and consists in employing an iron enamelled dish, in combination with an outer plated containing-vessel, or casing, as will be hereinafter more fully described.

In the accompanying plate of drawings—

Figure 1 represents a top view of the article complete.

Figure 2 is a vertical cross-section through the same.

Similar letters of reference indicate corresponding parts.

A represents an outer casing, or containing-vessel, used when the baking-dish is placed upon the table. This outer dish is made of plated or other ornamental ware, and is especially designed for containing the baking-dish, which is the subject-matter of this invention.

B B represent the ears on this outer vessel.

C is the baking-dish.

This dish is made of iron, or other durable metal, enamelled on the inside, or otherwise protected from corrosion, and suitable for containing the pudding, pie, or other article of diet, while being baked or cooked. This dish is designed to fit into the outer vessel A, and is placed therein, as the pudding or other article in the dish C is ready to be placed upon the table.

The rims of the two vessels, A and C, are covered by the concave ring D, so that the two vessels will present a finished and ornamental appearance when on the table. The ring D is plated, or otherwise rendered ornamental, the whole forming a most desirable article of table-furniture.

I am aware that earthen baking-dishes have been used in connection with an outer containing-vessel heretofore. I do not, therefore, claim broadly the combination of a baking-dish with an outer or containing-vessel. Such dishes are frail, are soon broken, and become useless.

Having thus described my invention,

What I do claim, and desire to secure by Letters Patent, is—

The combination with the outer containing-vessel and the ring D, the metallic baking-dish C, with its inside enamelled, or otherwise covered, and prevented from corroding, substantially as and for the purposes herein described.

H. C. WILCOX.

Witnesses:
COOKE LOUNSBURY,
N. A. MARKHAM.